United States Patent [19]

Rice, Jr.

[11] Patent Number: 5,022,324
[45] Date of Patent: Jun. 11, 1991

[54] PIEZOELECTRIC CRYSTAL POWERED IGNITION DEVICE

[75] Inventor: John H. Rice, Jr., Keyser, W. Va.

[73] Assignee: Hercules Incorporated, Wilmington, Del.

[21] Appl. No.: 362,125

[22] Filed: Jun. 6, 1989

[51] Int. Cl.$^5$ .............................................. F42C 19/00
[52] U.S. Cl. ..................... 102/201; 102/210
[58] Field of Search ............................... 102/201, 210

[56] References Cited

U.S. PATENT DOCUMENTS

| | | | |
|---|---|---|---|
| 3,258,910 | 7/1966 | Seymour | 60/35.6 |
| 3,337,758 | 8/1967 | Brothers | 310/8.4 |
| 3,389,275 | 6/1968 | Brothers | 310/8.3 |
| 3,408,937 | 11/1968 | Lewis et al. | 102/70.2 |
| 3,618,526 | 11/1971 | Baker | 102/70.2 |
| 3,909,745 | 9/1975 | Dye | 331/94.5 |
| 4,343,242 | 8/1982 | Welk | 102/201 |
| 4,391,195 | 7/1983 | Shann | 102/201 |
| 4,862,802 | 9/1989 | Streifer et al. | 102/201 |
| 4,870,903 | 10/1989 | Carel et al. | 102/201 |

FOREIGN PATENT DOCUMENTS

| | | | |
|---|---|---|---|
| 277052 | 11/1959 | Switzerland | 102/201 |
| 2056633 | 3/1981 | United Kingdom | 102/201 |

OTHER PUBLICATIONS

Norton, Piezoelectric Pressure Transducers, 2/63, 83–85.

*Primary Examiner*—Charles T. Jordan
*Assistant Examiner*—Rochelle Lieberman
*Attorney, Agent, or Firm*—Mark D. Kuller

[57] ABSTRACT

A device for ignition of a pyrotechnic material, comprising:
(a) piezoelectric means for providing a high voltage electrical pulse in response to mechanical energy;
(b) means for emitting a flash of light in response to the high voltage pulse; and
(c) a solid state laser capable of emitting a light beam sufficient to ignite a pyrotechnic material in response to said flash of light;

and a process of igniting a pyrotechnic device using the same, are disclosed.

21 Claims, 3 Drawing Sheets

PIEZOELECTRIC CRYSTAL POWERED IGNITION DEVICE

This invention is directed to a novel ignition device, useful for igniting pyrotechnic materials used in the ignition of solid propellant rocket motors and explosive devices used in commercial blasting or military ordnance, and a process of igniting a pyrotechnic device using this ignition device.

BACKGROUND OF THE INVENTION

Laser ignition devices comprising neodymium glass or YAG lasers are known, as described in U.S. Pat. Nos. 4,391,195, 3,618,526 and 3,408,937. The lasers in these devices are "pumped" or caused to emit their polarized light beam when excited by external light sources such as gas-filled flash tubes (xenon or mercury filled) or pyro flash lamps (zirconium and compressed oxygen filled) of the type used with photographic cameras. Gas-filled flash tubes require high-voltage power supplies and large storage capacitors for proper operation. Standard pyro flash lamps contain electrical bridge-wires which require a high current source for proper operation. Neither of these light sources are desirable for use in applications where small, lightweight ignitions systems are a must. Further, long term storage of an ordnance ignition system which requires battery power is undesirable.

Many pyrotechnic or ordnance systems are required to operate in areas or environments where storage of a high-current power source, such as a battery, is impractical or impossible. For instance, in a system such as the pyrotechnic devices in an aircraft ejection seat, the on-board power system may be damaged in the same instance which makes ejection necessary. Therefore, lightweight, small ignition devices that may be stored for long periods of time and have their own power source are desired.

The inventor has developed an ignition device capable of emitting a high level of laser energy without use of a high-current power source such as a battery or a large capacitor, useful for igniting pyrotechnic materials used in the ignition of solid propellant rocket motors or explosive device used in commercial blasting or military ordnance, which is lighter and smaller than conventional ignition devices and which can be stored over long periods of time.

SUMMARY OF THE INVENTION

This invention is a device for ignition of a pyrotechnic material, comprising:
(a) piezoelectric means for providing a high voltage electrical pulse in response to mechanical energy;
(b) means for emitting a flash of light in response to the high voltage pulse; and
(c) a solid state laser capable of emitting a light beam sufficient to ignite a pyrotechnic material in response to said flash of light; and a process of igniting a pyrotechnic device using the same.

DETAILED DESCRIPTION OF THE INVENTION

The ignition device of this invention contains piezoelectric means for providing a high voltage electrical pulse in response to mechanical energy. Such piezoelectric means produce opposite electrical charges on different surfaces when stressed mechanically. Crystals of tourmaline, Rochelle salt, lead-zirconate titanate and other substances will produce this effect, with lead-zirconate titanate being preferred. Exemplary piezoelectric devices useful in this invention include Ferroperm Piezoceramics Type PZ 24 and PZ 26 (Seacor Inc., Westwood, N.J.).

The piezoelectric means used in this invention should emit a high enough voltage to power the light emitting means as described below, typically in the order of 10,000 or more, preferably 20,000–50,000, volts. Preferably, the piezoelectric constant is $160 \times 10^{-12}$ C/N (coulombs/frequency constant) to $275 \times 10^{-12}$ C/N. Typically, such piezoelectric devices have a diameter as small as 0.1 inch and a length as little as 0.1 inch. One preferred unit has a diameter of about 0.175 inches and a length of about 0.350 inches. A comparable battery or power supply capable of achieving the same objectives may be 100 cubic inches and weigh several pounds.

The piezoelectric means is triggered by a mechanical energy source sufficient to cause the piezoelectric means to emit a high enough voltage to power the light emitting means. In some instances, the piezoelectric device will be triggered by external mechanical energy, for instance, a spring loaded mass (e.g., a one ounce weight set in motion by a spring having approximately a 10 ounce/inch strength), external energy caused by an explosive impulse, etc. In other instances, the triggering or high mechanical energy means is part of the ignition device. For instance, gas pressure generated by the operation of a pyrotechnic device triggered by an external spring loaded mass can be used to set in motion one or more other pyrotechnic devices, each triggered by an internal mass which strikes a piezoelectric crystal to cause the excitation of a laser unit.

The means for emitting light in response to the high voltage electrical pulse typically comprises one or more pyro flash lamps similar to those used in photography. Such flash lamps should be sufficient to excite the light beam emitting means so that it will ignite the pyrotechnic material. The pyro flash lamps useful in this invention have an outer glass envelope with pins coated with a pyrotechnic mixture which pass through the glass envelope and form a spark gap (without a bridge wire). Such lamps generally have a shred or foil of zirconium, preferably reactor grade, hafnium free, zirconium, and are filled with compressed oxygen. They flash in response to a high voltage pulse, e.g., in the order of 10,000 or more volts. Preferred are pyro flash lamps having a light output of not less than 3800 Lumin-Seconds, with peak light occurring in less than 10 milliseconds after ignition, and which fire with the application of at least 10,000 volts. Illustrative is Sylvania Model No. S-1 (GTE Products Corporation, Montoursville, Pa.). The number of flash lamps used depends on the laser power required and/or the reliability required (redundancy required). Typically, the ignition device of this invention contains three or more, preferably six, such flash lamps surrounding the laser and connected electrically in a series configuration. Use of more than three flash lamps is primarily to ensure that there is redundancy in the system.

The laser is preferably a solid state ruby, neodymium YAG or neodymium glass laser, with the latter being preferred as it is useful over the broadest temperature range and is most economical. These lasers usually comprise a rod doped with 6 to 9% neodymium molecules surrounded by clear glass clading emitting 1.06 micrometer amplified light. The laser is "pumped" or caused to emit its polarized light beam when the neodymium atoms are excited (and then decay) after light from the flash lamp enters through the sides of the laser. One laser useful in this invention is a Q-100 clad neodymium glass rod (Kigre Incorporated, Hilton Head Island, S.C. having a 0.236 inch core and 1.740 inches long, with Plano/Plano ends. The ends are parallel within 2 inch arc. The finish is 10/5 S/D (Scrape/Dig) and Lambda over 10 flat. Reflectivity is maximum on one end and 95.5% on the other end. The outside diameter has either a fine ground or polished finish. Such lasers are available from Kigre Incorporated and Hoya Optics Incorporated (Freemont, Calif.

The laser light beam must have sufficient power so as to heat a sufficient mass of pyrotechnic material so as to cause the desired ignition, for instance, ignition of the igniter or propellant of a rocket motor. The light beam may be applied directly to the pyrotechnic material to be ignited or an ignitor (initiator), i.e., separate pyrotechnic material used for ignition. The focused light beam may be applied directly to the pyrotechnics or through optical fiber cable. A planoconvex optic lens is used to focus or condense the beam. The lens typically will focus the laser beam from a diameter of ¼ inch to a diameter of 0.035 inch. Optical fiber cable (e.g., fused silica optical fibers) is useful where it is desirable to separate the ignition device and the device containing the pyrotechnic material and where ignition of more than one pyrotechnic material containing device using one laser ignition device is desired.

Ignition devices per this invention may have one or more mechanical or electrical safety features. In a preferred embodiment the ignition device has both a mechanical and electrical safety device.

BRIEF DESCRIPTION OF THE DRAWING

Since the laser must be applied to the pyrotechnic material to be ignited, mechanical means for preventing the laser beam from striking the pyrotechnic material can be used to prevent undesired ignition. FIG. 1 shows an ignition device having a piezoelectric crystal (1), a solid state laser (2), four photoflash lamps surrounding the laser and electrically connected to the piezoelectric device and each other in a series configuration (3), an optical lens (4) for focusing the laser beam, a shutter (5) in closed position and an initiator (6) (capsule containing pyrotechnic material used to ignite a solid rocket motor). The spring loaded weight assembly (7) may form part of the initiator device or may be in a separate device. In FIG. 1, the shutter is shown in the closed position where it prevents the laser beam from reaching and igniting the pyrotechnic material. In FIG. 1(a), the spring loaded weight is shown striking the piezoelectric crystal and producing a high voltage pulse and a high voltage electrical pulse is shown causing the lamps to flash. The shutter is shown in its open position and a laser beam is shown passing through the optical lens, by the shutter, though the glass initiator window (pressure seal) (6a) and striking the pyrotechnic material of the initiator. The hot gas output (9) of the initiator pyrotechnic material is shown. In this embodiment, this hot gas ignites the pyrotechnics of a solid rocket motor.

In another embodiment, a rotating shaft having a hole is placed between the laser and the pyrotechnic material or the optical fiber for transmitting the laser beam to the pyrotechnic material. A safe condition exists when the hole and laser beam are out of alignment, since the shaft will prevent the laser beam from reaching and igniting the pyrotechnic material. To arm the device the shaft is rotated so that the laser beam may travel through the hole.

Other mechanical safety devices, such as means for rotating or moving the laser (or structure comprising the laser and flash lamps) into and out of alignment with the pyrotechnic material or optical fiber, means for moving or rotating the optical fiber into and out of alignment, and mechanical means for preventing the device from being triggered (e.g., locking the release handle or firing pin in place, using a rotating spring-loaded mass with safe and arm positions, etc.), may be used to prevent undesired ignition.

A shorting switch can also be used as a safe device. For instance, a wire connecting the two pins of the flash lamp creates a short circuit and prevents sparking across the spark gap in the flash lamp.

Figure 1:
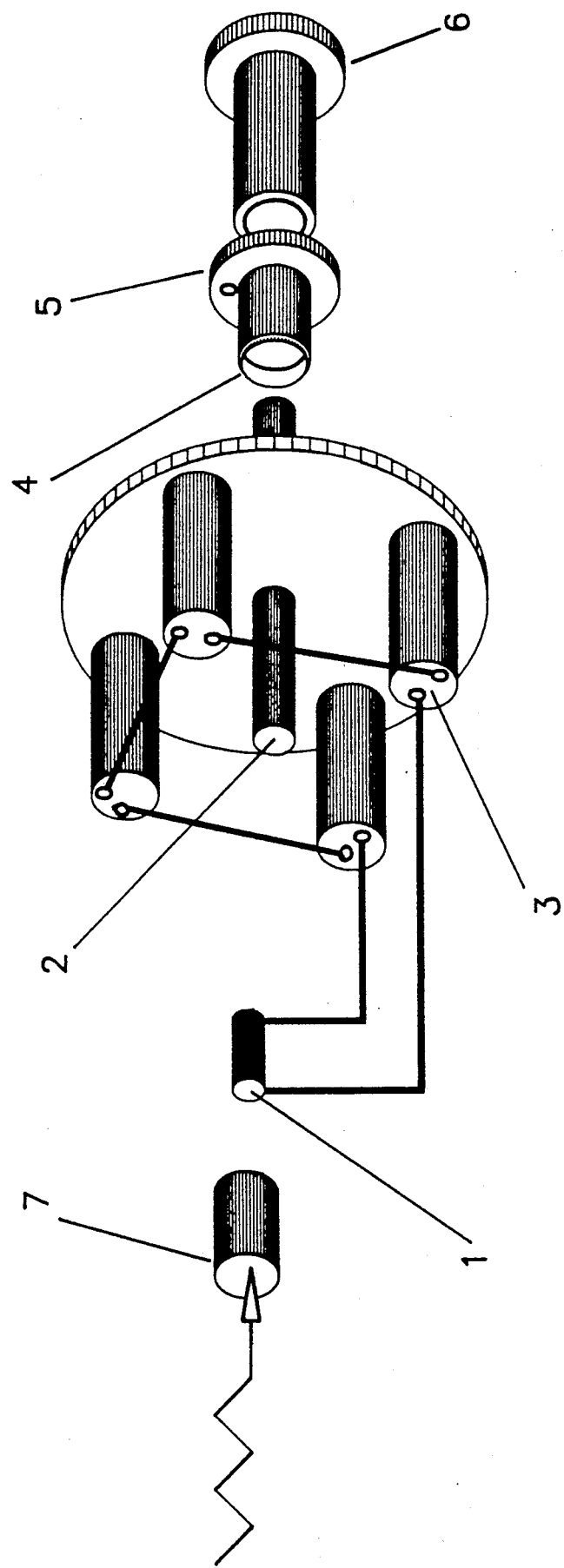
FIG. 1 is a diagram showing a piezoelectric crystal ignition device.
Figure 1A:
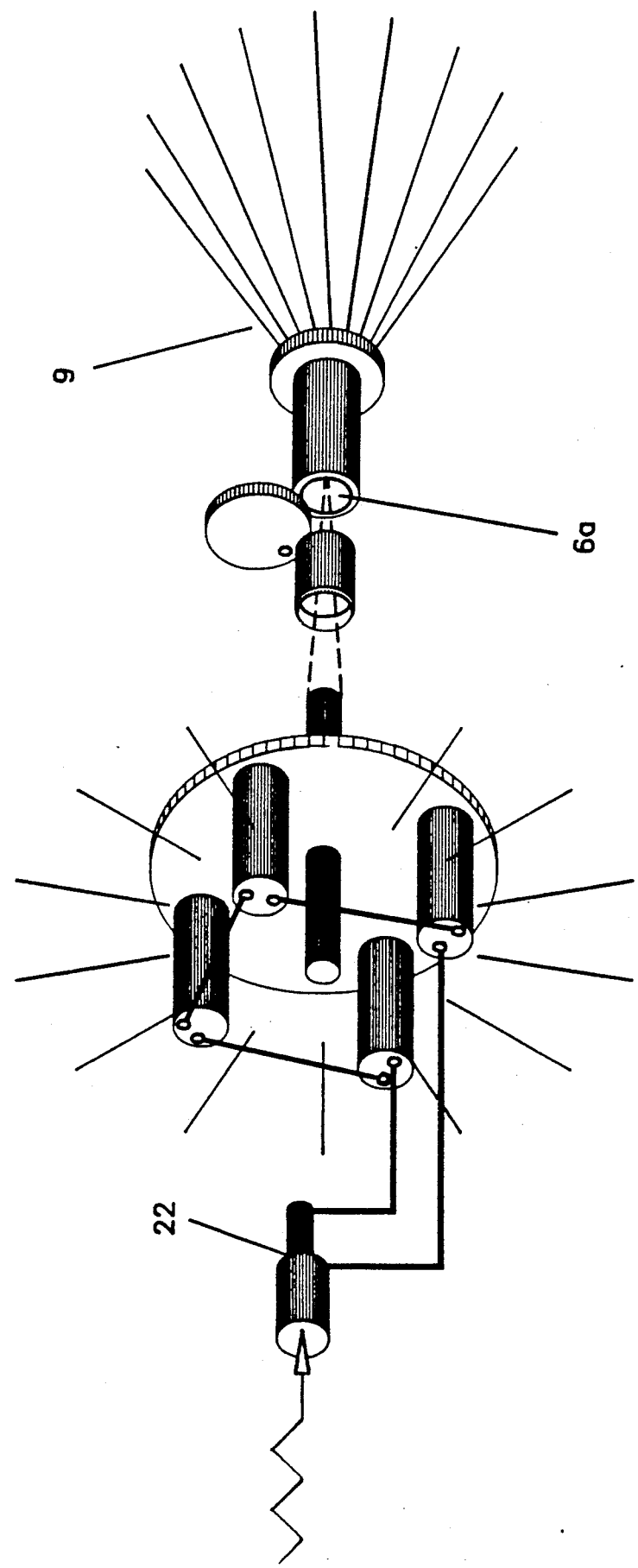
FIG. 1a is a diagram showing a weight striking the piezoelectric crystal of the ignition device.
Figure 2:
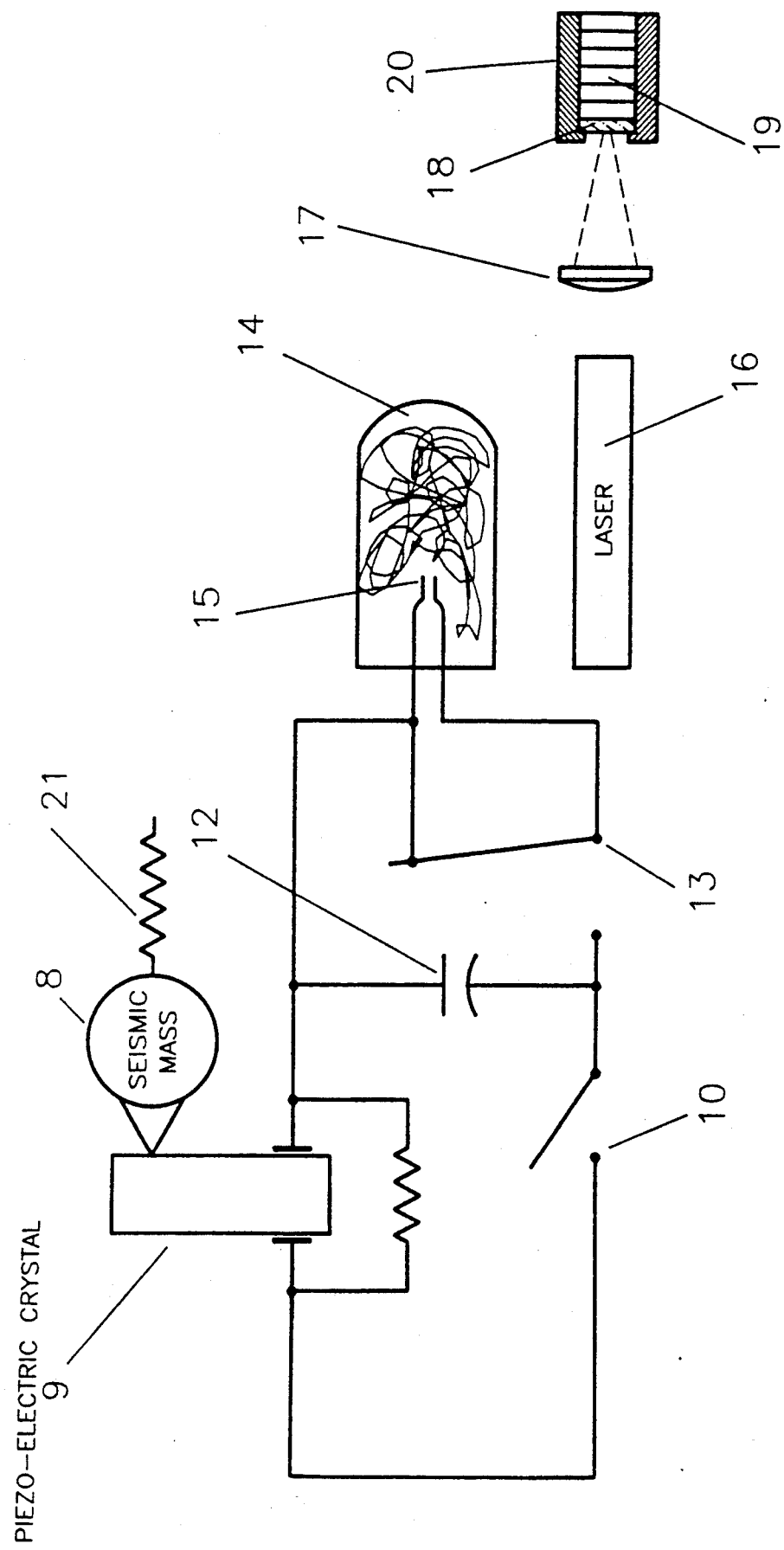
FIG. 2 is a schematic diagram showing a laser ignition system for use in a projectile.

FIG. 2 is a schematic diagram of one embodiment of a laser ignition system for use in a gun-launched rocket-assisted projectile. Using gun propellant ignited by conventional firing pin, the rocket-assisted projectile is fired from a gun. The "set-back" force or gun motion (21) created when the gun is fired causes a seismic mass or weight (8) in the rocket motor to be set in motion and strike and stress a piezoelectric crystal (9). An electrical safety switch (10) is closed by the same force. The electrical energy created when the piezoelectric crystal is stressed is stored in the high voltage storage capacitor (12). As the projectile exits the gun, the negative acceleration force which is experienced causes the time delay switch (13) to close. As the switch closes, the stored electrical energy in the capacitor is applied to the flash lamps (14) (only one is shown) having a spark gap (15), causing them to fire. The resulting light pumps the laser (16) which emits a light beam that travels though lens (17) and window (18) to strike the pyrotechnic material (19) of rocket motor initiator (20), causing the pyrotechnic material to ignite the rocket motor. The resulting thrust increases the velocity and range of the gun-fired projectile. The capacitor used in this embodiment has a capacitance of 0.1 to 1.0 microfarad and is smaller than those used for firing gas filled lasers.

The ignition device of this invention is light weight, comparatively small, can be stored over an unlimited period of time and provides high levels of laser energy. It is well-suited for ignition of relatively insensitive pyrotechnic materials such as solid rocket motors, explosive device used in commercial blasting or military ordnance, etc.

One significant advantage of the ignition device of this invention is its small size and light weight. Devices as small as one inch in diameter and two inches long, and as light as two ounces can be prepared. The ignition device of this invention can be used to ignite most pyrotechnic or ordnance systems which can be ignited using conventional laser ignition devices and other types of devices for which use of such devices was impractical or impossible due to constraints caused by use of a high-current power source, e.g., devices where previously electro explosive squibs would be the preferred means of ignition. Another advantage of this invention is that redundancy can easily be built in to the system, both to ensure safety when ignition is not desired and to ensure proper and timely ignition.

While the invention has been described with respect to specific embodiments, it should be understood that they are not intended to be limiting and that many variations and modifications are possible without departing from the scope of this invention.

I claim:

1. A device for ignition of a pyrotechnic material, comprising:
   (a) piezoelectric means for providing a high voltage electrical pulse in response to mechanical energy;
   (b) a pyro flash lamp having a spark gap for emitting a flash of light in response to the high voltage pulse; and
   (c) a solid state laser capable of emitting a light beam sufficient to ignite a pyrotechnic material in response to said flash of light.

2. The device of claim 1, wherein the laser is a ruby, neodymium glass or neodymium YAG laser.

3. The device of claim 1, wherein the pyro flash lamp has an outer glass envelope surrounding a shred or foil of zirconium and compressed oxygen, has pins coated with a pyrotechnic mixture which pass through the glass envelope and form a spark gap within the glass envelope, flashes in response to a high voltage pulse on the order of 10,000 or more volts, and has a light output of not less than 3800 Lumin-Seconds with peak light occurring in less than 10 milliseconds after ignition.

4. The device of claim 1, further comprising means for focusing the light beam onto a pyrotechnic material.

5. The device of claim 4, wherein the means for focusing the light beam onto a pyrotechnic material is an optical lens.

6. The device of claim 1, wherein the piezoelectric means comprises crystals selected from the group consisting of crystals of tourmaline, Rochelle salt and lead-zirconate titanate.

7. The device of claim 1, further comprising mechanical-energy producing means for providing mechanical energy to the piezoelectric means.

8. The device of claim 6, further comprising mechanical-energy producing means for providing mechanical energy to the piezoelectric means.

9. The device of claim 1, further comprising optical fibers for transmitting the light beam to a pyrotechnic material.

10. The device of claim 1, further comprising safety means to prevent undesired ignition of a pyrotechnic material.

11. The device of claim 10, wherein the safety means is selected from the group consisting of a shutter, a rotating shaft having a hole permitting transmission of the light beam and a shorting switch.

12. The device of claim 1, further comprising mechanical-energy producing means which provides mechanical energy to the piezoelectric means upon firing of a rocket motor containing the ignition device; a capacitor having a capacitance of 0.1 to 1.0 microfarad for storing the electricity created when the piezoelectric means emits a high voltage electrical pulse; and a time delay switch which closes upon negative acceleration force.

13. A process of igniting a pyrotechnic material using the device of claim 3 comprising applying mechanical energy to the piezoelectric means.

14. A device for ignition of a pyrotechnic material, comprising:
   (a) piezoelectric means for providing a high voltage electrical pulse in response to mechanical energy;
   (b) a pyro flash lamp which has an outer glass envelope surrounding a shred or foil of zirconium and compressed oxygen, has pins coated with a pyrotechnic mixture which pass through the glass envelope and form a spark gap within the glass envelope, emits a flash of light in response to a high voltage pulse on the order of 10,000 or more volts, and has a light output of not less than 3800 Lumin-Seconds with peak light occurring in less than 10 milliseconds after ignition; and
   (c) a ruby, neodymium glass or neodymium YAG solid state laser capable of emitting a light beam sufficient to ignite a pyrotechnic material, in response to said flash of light.

15. The device of claim 14, wherein the piezoelectric means comprises crystals selected from the group consisting of crystals of tourmaline, Rochelle salt and lead-zirconate titanate.

16. The device of claim 15, further comprising mechanical-energy producing means for providing mechanical energy to the piezoelectric means.

17. The device of claim 15, further comprising optical fibers for transmitting the light beam to a pyrotechnic material.

18. The device of claim 15, further comprising safety means selected from the group consisting of a shutter, a rotating shaft having a hole permitting transmission of the light beam and a shorting switch.

19. The device of claim 15, having three of more flash lamps surrounding the laser.

20. The device of claim 15, further comprising an optical lens for focusing the light beam onto the pyrotechnic material.

21. A process of igniting a pyrotechnic material using the device of claim 1 comprising applying mechanical energy to the piezoelectric means.

* * * * *